United States Patent
Binek et al.

(10) Patent No.: US 11,541,434 B2
(45) Date of Patent: Jan. 3, 2023

(54) VORTEX ASSISTED POWDER REMOVAL END EFFECTOR

(71) Applicant: UNITED TECHNOLOGIES CORPORATION, Farmington, CT (US)

(72) Inventors: Lawrence Binek, Glastonbury, CT (US); David W. Morganson, Marlborough, CT (US); Diana Giulietti, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1031 days.

(21) Appl. No.: 16/243,708

(22) Filed: Jan. 9, 2019

(65) Prior Publication Data
US 2020/0215587 A1    Jul. 9, 2020

(51) Int. Cl.
*B08B 5/04* (2006.01)
*B33Y 40/00* (2020.01)

(52) U.S. Cl.
CPC .............. *B08B 5/04* (2013.01); *B33Y 40/00* (2014.12)

(58) Field of Classification Search
CPC ........... B08B 5/04; B33Y 40/00; B33Y 40/20; B22F 2999/00; B22F 3/24; Y02P 10/25
See application file for complete search history.

(56) References Cited

U.S. PATENT DOCUMENTS

| | | | | |
|---|---|---|---|---|
| 2,027,543 | A  * | 1/1936 | Lofgren | A47L 9/02 |
| | | | | 15/420 |
| 5,457,847 | A  * | 10/1995 | Uzawa | B08B 5/026 |
| | | | | 15/345 |
| 6,363,606 | B1 | 4/2002 | Johnson, Jr. et al. | |
| 6,719,830 | B2 * | 4/2004 | Illingworth | F15D 1/00 |
| | | | | 55/438 |
| 6,913,213 | B2 | 7/2005 | Bertellotti et al. | |
| 9,987,682 | B2 | 6/2018 | Torabi et al. | |
| 10,046,552 | B2 | 8/2018 | Swartz et al. | |
| 2007/0266521 | A1* | 11/2007 | Pang Kim Pong | A47L 9/02 |
| | | | | 15/420 |
| 2011/0214246 | A1* | 9/2011 | Marshall | A47L 5/14 |
| | | | | 15/345 |
| 2014/0007372 | A1* | 1/2014 | Cheng | B08B 15/04 |
| | | | | 15/345 |
| 2015/0027490 | A1* | 1/2015 | Sun | C03C 23/0075 |
| | | | | 15/345 |
| 2017/0072439 | A1* | 3/2017 | Mims | E02F 3/9243 |
| 2018/0009007 | A1 | 1/2018 | Craft et al. | |
| 2018/0185915 | A1 | 7/2018 | Beauchamp | |
| 2018/0264732 | A1 | 9/2018 | Swartz et al. | |

(Continued)

FOREIGN PATENT DOCUMENTS

DE    102006013022    5/2007
EP    350628    9/1992

*Primary Examiner* — Erin F Bergner
(74) *Attorney, Agent, or Firm* — Snell & Wilmer L.L.P.

(57) ABSTRACT

An end effector for a vacuum system is disclosed. In various embodiments, the end effector includes a central duct having a first end configured for connection to a vacuum source and a second end defining a central duct inlet; a base member proximate the second end of the central duct; and a plurality of passages extending from an outer surface of the base member to an inner surface of the central duct, the plurality of passages characterized by a passage axis having an axial vector component.

17 Claims, 4 Drawing Sheets

(56) References Cited

U.S. PATENT DOCUMENTS

2018/0311769 A1 11/2018 TenHouten et al.
2020/0223401 A1* 7/2020 Little ................. H04N 5/22521
2020/0316656 A1* 10/2020 Kwan ....................... B08B 5/02

* cited by examiner

VORTEX ASSISTED POWDER REMOVAL END EFFECTOR

FIELD

The present disclosure relates to additive manufacturing systems and, more particularly, to methods and apparatus used in additive manufacturing systems.

BACKGROUND

Additive manufacturing (AM) is a method of manufacture where component parts are constructed through layer-by-layer deposition of material. Compared to other methods of manufacture, AM offers several advantages, including, for example, reduced material waste, part consolidation and the ability to produce parts directly without the need for expensive part-specific tooling. Metallic AM methods, including, for example, laser powder bed fusion (L-PBF) methods, are capable of producing net-shape parts by utilizing thin (e.g., 20-80 μm) layers of material and small (e.g., 50-100 μm) laser spot sizes. Unlike the case with more conventional methods, such as forging or casting, metallic AM methods may be used to create parts having complex internal geometries.

With many AM techniques or, more broadly, 3-D printing techniques, residual powder may remain in a chamber within which the component parts are being fabricated. The residual powder, which is expensive and may comprise a volume many times the volume of the component parts being manufactured, is advantageously removed and reclaimed for subsequent use. Current removal techniques may, however, prove cumbersome and result in lost or contaminated material. Current vacuum-based removal techniques may also result in partially or completely clogged vacuum lines or hoses, particularly as a result of surge phenomena occurring due to inadequate flow of air or the surrounding gas. Methods and apparatus that reduce the occurrence of surging and increase the efficiency of vacuum-based removal techniques may serve to reduce the overall cost of component part fabrication using additive manufacturing techniques.

SUMMARY

An end effector for a vacuum system is disclosed. In various embodiments, the end effector includes a central duct having a first end configured for connection to a vacuum source and a second end defining a central duct inlet; a base member proximate the second end of the central duct; and a plurality of passages extending from an outer surface of the base member to an inner surface of the central duct, the plurality of passages characterized by a passage axis having an axial vector component.

In various embodiments, the central duct inlet is defined by an inlet lip extending about a central axis that extends longitudinally along the central duct. In various embodiments, an exterior shield extends along the central axis from the central duct inlet toward the second end. In various embodiments, the exterior shield defines a fluid space between the central duct and the exterior shield. In various embodiments, a first opening of each of the plurality of passages is in fluid communication with the fluid space between the central duct and the exterior shield. In various embodiments, the central duct and the exterior shield are circular in cross section and the fluid space is defined by an annular space between the central duct and the exterior shield.

In various embodiments, the plurality of passages is configured to provide a supplemental flow induced by a main flow passing through the central duct. In various embodiments, the axial vector component is defined by an axial angle between the passage axis and a central axis that extends longitudinally along the central duct. In various embodiments, the axial angle is about forty-five degrees. In various embodiments, the passage axis has a radial vector component defined by a radial angle between the passage axis and a radial axis extends perpendicular to a central axis that extends longitudinally along the central duct. In various embodiments, the radial angle is about thirty degrees.

A powder removal system configured for removal of powder at a material surface is disclosed. In various embodiments, the powder removal system includes a vacuum system having a storage tank and a suction hose; a central duct having a first end configured for connection to the suction hose and a second end defining a central duct inlet, the central duct inlet configured for positioning proximate the powder at the material surface; a base member proximate the second end of the central duct; and a plurality of passages extending from an outer surface of the base member to an inner surface of the central duct, the plurality of passages oriented to provide a supplemental flow toward the material surface during a surge condition.

In various embodiments, an exterior shield extends along a central axis and about the central duct from the central duct inlet toward the second end. In various embodiments, a first opening of each of the plurality of passages is in fluid communication with a fluid space between the central duct and the exterior shield. In various embodiments, the central duct inlet is defined by an inlet lip extending about the central axis and configured for positioning proximate the material surface.

In various embodiments, the plurality of passages is configured to induce the supplemental flow by a main flow passing through the central duct. In various embodiments, at least a subset of the plurality of passages is characterized by a passage axis having an axial vector component defined by an axial angle between the passage axis and a central axis that extends longitudinally along the central duct. In various embodiments, the passage axis has a radial vector component defined by a radial angle between the passage axis and a radial axis extending perpendicular to the central axis.

A method of removing a powder from a material surface during a surge condition is disclosed. In various embodiments, the method includes the steps of positioning an end effector proximate the material surface, the end effector having a central duct having a first end configured for connection to a vacuum source and a second end defining a central duct inlet, a base member proximate the second end of the central duct, and a plurality of passages extending from an outer surface of the base member to an inner surface of the central duct; and drawing a main flow through the central duct using the vacuum source, the main flow being sufficient to establish a supplemental flow through the plurality of passages and to cause the supplemental flow to reach the material surface during the surge condition. In various embodiments, the plurality of passages is characterized by a passage axis having an axial vector component and a non-zero radial vector component.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
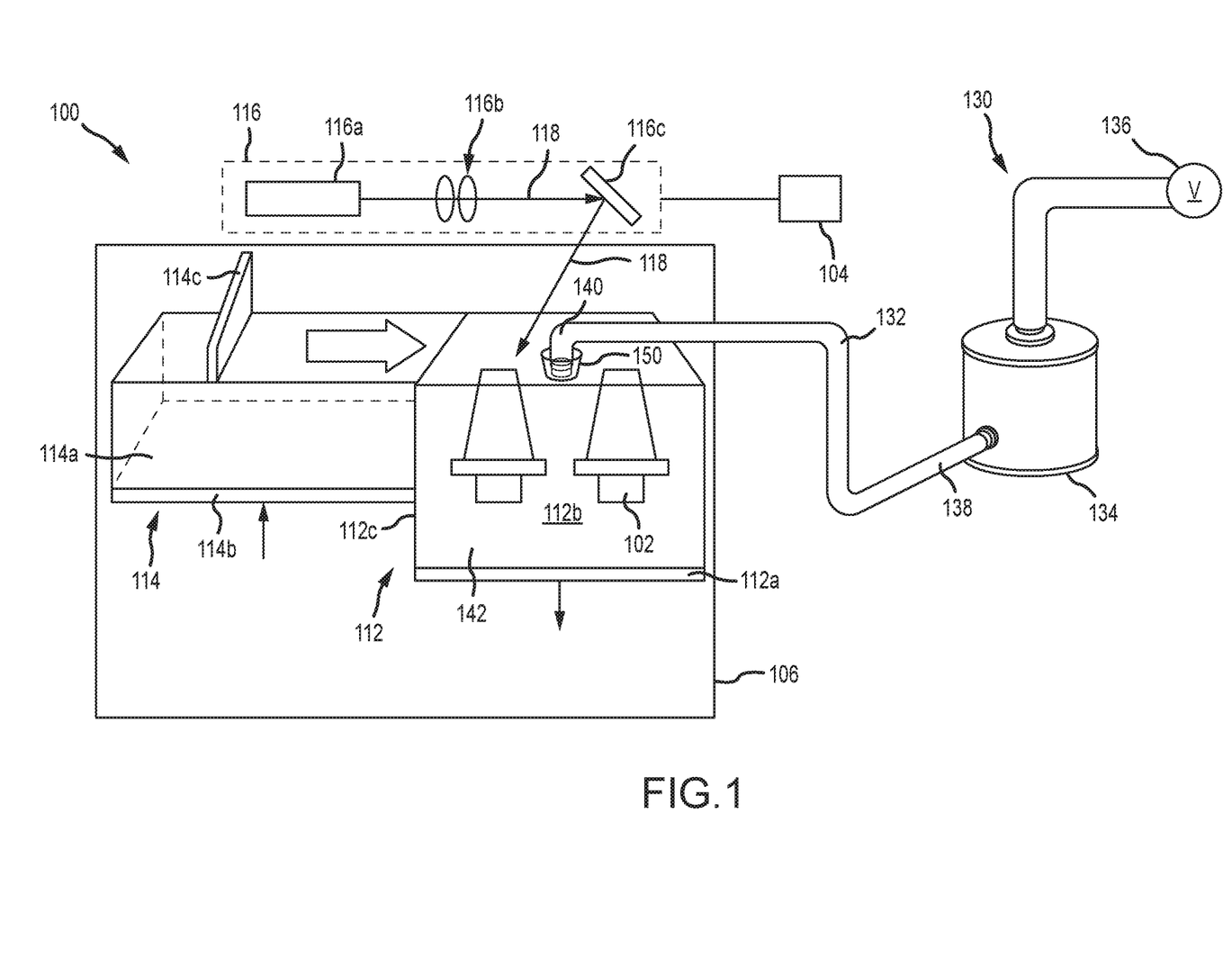
FIG. 1 is a schematic view of an additive manufacturing system, in accordance with various embodiments.

Referring now to the drawings, FIG. 1 illustrates an additive manufacturing system 100, in accordance with various embodiments. The additive manufacturing system 100 may comprise a powder bed fusion machine 110 configured to fabricate a component part 102 using an additive manufacturing process. A vacuum system 130 is also illustrated and configured to remove powder following fabrication of the component part 102 using the additive manufacturing process. Although the component part 102 illustrated in FIG. 1 takes the form of an airfoil (e.g., a turbine blade), the disclosure contemplates myriad other such component parts, including, without limitation, seals, tubes, brackets, fuel nozzles, heat shields, liners or panels. Additionally, the component parts may be fabricated from a wide range of materials, including, but not limited to, metal alloys. Further, while the disclosure focuses on the powder bed fusion machine 110 and the vacuum system 130 described herein, the disclosure also contemplates other additive manufacturing equipment and processes and, therefore, is not intended to be limited to the powder bed fusion and vacuum equipment and processes described herein.

In various embodiments, the powder bed fusion machine 110 generally includes a work bed 112, a powder deposition device 114 that is operable to deposit a powder (e.g., a metal powder) in the work bed 112, an energy beam device 116 configured to emit an energy beam 118 onto the work bed 112 and toward the component part 102 during fabrication of the part. In various embodiments, the energy beam 118 exhibits a variable power and a variable scan rate configured to melt and fuse regions of the powder. The additive manufacturing system 100 may further comprise a controller 104 in communication with the energy beam device 116 and, as described below, other components of the system, including, for example, the vacuum system 130. An environmental chamber 106 may be used to enclose one or more components of the additive manufacturing system 100, including, for example, the work bed 112 and the powder deposition device 114. Additional components, such as, but not limited to, vacuum pumps, process gas sources and related valves may be included in the additive manufacturing system 100.

With continued reference to FIG. 1, in various embodiments, the work bed 112 includes a build plate 112a upon which the powder is deposited and the component part 102 is built. The build plate 112a may be actuated using a piston or the like to lower the build plate 112a during the process. The work bed 112 also defines a work bed volume 112b, such as, for example, the volume defined by the build plate 112a and an enclosure 112c within which the component part 102 is fabricated. The powder deposition device 114 may include a powder supply bed 114a supported on a bed plate 114b, and a re-coater arm 114c. The bed plate 114b may be actuated using a piston or the like to raise the bed plate 114b during the fabrication process. The re-coater arm 114c is operable to move across the powder supply bed 114a and the work bed 112, to deposit layers of powder in the work bed 112. Operation of the work bed 112 and powder deposition device 114 may be controlled via the controller 104. In various embodiments, the energy beam device 116 includes a laser 116a, one or more lenses 116b and a mirror 116c. The mirror 116c may be actuated (at the command of the controller 104) to control the direction of the energy beam 118 onto the work bed 112 and the component part 102.

Still referring to FIG. 1, in various embodiments, the vacuum system 130 includes a suction hose 132, a storage tank 134 and a vacuum source 136. In various embodiments, the suction hose 132 includes a first end 138 connected to the storage tank 134 and a second end 140 connected to a vacuum end effector 150. The vacuum system 130 is configured to remove a residual powder 142 or quantity or volume of the residual powder 142 following fabrication of the component part 102. For example, following fabrication of the component part 102, the work bed volume 112b may contain both the component part 102 and the residual powder 142, which generally comprises a quantity or volume of unsintered powder not melted by the energy beam 118 during the fabrication process. In various embodiments, the residual powder 142 may be removed from the work bed volume 112b using the vacuum system 130 by translating the second end 140 of the suction hose 132 over an accessible surface of the residual powder 142 until the residual powder 142 is removed from the work bed volume 112b. In various embodiments, the translation of the second end 140 of the suction hose 132 over the accessible surface of the residual powder 142 may be performed manually or by automation. Using either manner of translation, the vacuum end effector 150, as described in further detail below, may render the removal process more efficient by preventing occurrences of surge or, if surge occurs, by rapidly eliminating the conditions leading to the surge.

Figure 2A:
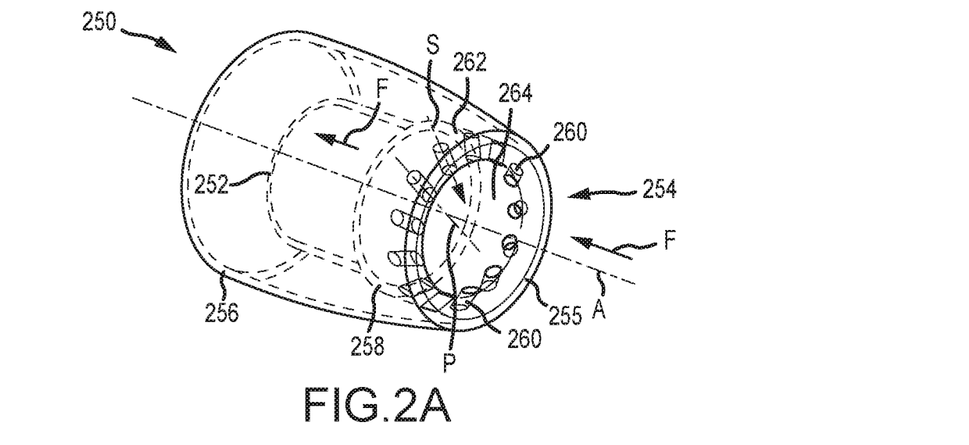
FIGS. 2A, 2B and 2C are perspective, side and axial schematic views of an end effector, in accordance with various embodiments.
Figure 2B:
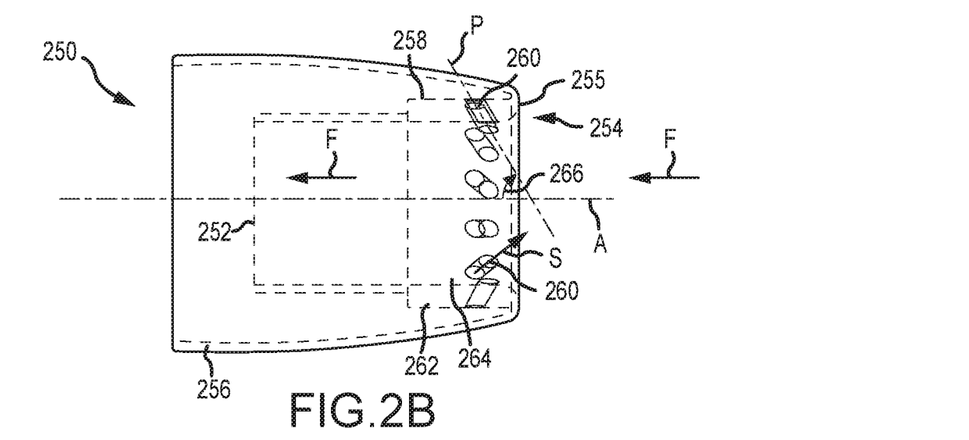
Figure 2C:
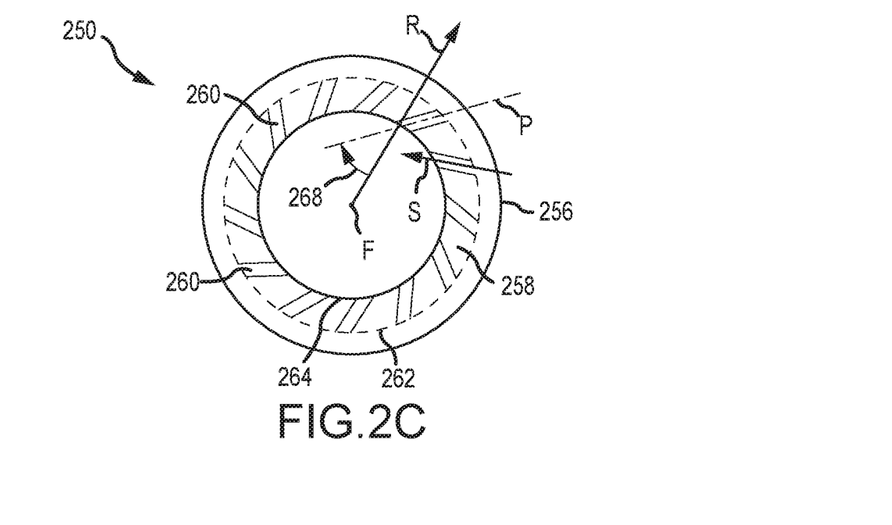

Referring now to FIGS. 2A, 2B and 2C, a vacuum end effector 250, such as, for example, the vacuum end effector 150 described above with reference to FIG. 1, is illustrated. In various embodiments, the vacuum end effector 250 includes a central duct 252, a central duct inlet 254 (or inlet) and a shield 256 (or exterior shield), each of which may extend along or about a central axis A. In various embodiments, the central duct 252 includes a base member 258 that extends circumferentially about the central duct 252 and that includes a plurality of passages 260 extending from a radially outer surface 262 of the base member 258 to a radially inner surface 264 of the central duct 252. In various embodiments, the base member 258 may comprise a portion of the central duct 252 proximate the central duct inlet 254, such that the base member 258 and the central duct 252 comprise a monolithic component that share the same radially inner and outer dimensions. In various embodiments, the shield 256 defines a fluid space between the central duct 252 (or an outer surface of the central duct 252) and the shield 256 (or an inner surface of the shield 256) that is in fluid communication with each of the plurality of passages 260. While the various components, including, for example, the central duct 252, the central duct inlet 254 and the shield 256 are illustrated having substantially radial or circumferential geometries, the disclosure contemplates other geometries, such as, for example, square, triangular, rectangular or other polygonal geometries, or combinations of each of the foregoing note shapes.

Typically, the plurality of passages 260 is disposed downstream of an inlet lip 255 that extends circumferentially about the central axis A and defines the central duct inlet 254. In various embodiments, a main flow F flows in a principally axial direction, with respect to the central axis A, by action of a vacuum applied to the central duct 252. In addition, a supplemental flow S is set up to flow through each of the plurality of passages 260, typically by aspiration caused by the main flow F. In various embodiments, the supplemental flow S, as described in further detail below, may be exploited to render the removal process, described above, more efficient with regard to surge occurrences. In various embodiments, an orientation of each of the plurality of passages 260, or a subset thereof, with respect to the central axis A and a radial axis R, may be defined by a passage axis P that extends longitudinally through each of the plurality of passages 260. For example, as illustrated in FIGS. 2A, 2B and 2C, the passage axis P extends through one of the plurality of passages 260. In FIG. 2B, the passage axis P is illustrated having an axial vector component, represented by an axial angle 266, with respect to the central axis A. The axial vector component, or axial angle 266, is configured to establish an axial component to the supplemental flow S, flowing through each of the plurality of passages 260, or through a subset thereof. In various embodiments, the axial angle 266 is within a range of from about five degrees (5°) to about eight-five degrees (85°); in various embodiments, the axial angle 266 is within a range of from about twenty-five degrees (25°) to about sixty-five degrees (65°); and in various embodiments, the axial angle 266 is about forty-five degrees (45°).

Similarly, in FIG. 2C, the passage axis P is illustrated having a radial vector component, represented by a radial angle 268, with respect to the radial axis R. The radial vector component, or the radial angle 268, is configured to establish a radial component (or swirl component) to the supplemental flow S, flowing through each of the plurality of passages 260, or through a subset thereof. In various embodiments, the radial angle 268 is within a range of from about zero degrees (0°) to about sixty degrees (60°); in various embodiments, the radial angle 268 is within a range of from about twenty degrees (20°) to about forty degrees (40°); and in various embodiments, the radial angle 268 is about thirty degrees (30°). The foregoing ranges of the axial angle 266 and the radial angle 268 are described with respect to the passage axis P extending through a single one of the plurality of passages 260. In various embodiments, however, a first subset of the plurality of passages 260 may be defined by a first passage axis $P_1$ and a second subset of the plurality of passages 260 may be defined by a second passage axis $P_2$, where the vector components of the first passage axis $P_1$ are different from those of the second passage axis $P_2$. In various embodiments, any number of distinct passage axes, e.g., from a single passage axis to a number of passage axes equal to the number of passages in the plurality of passages 260, may be incorporated into the vacuum end effector 250.

Figure 3A:
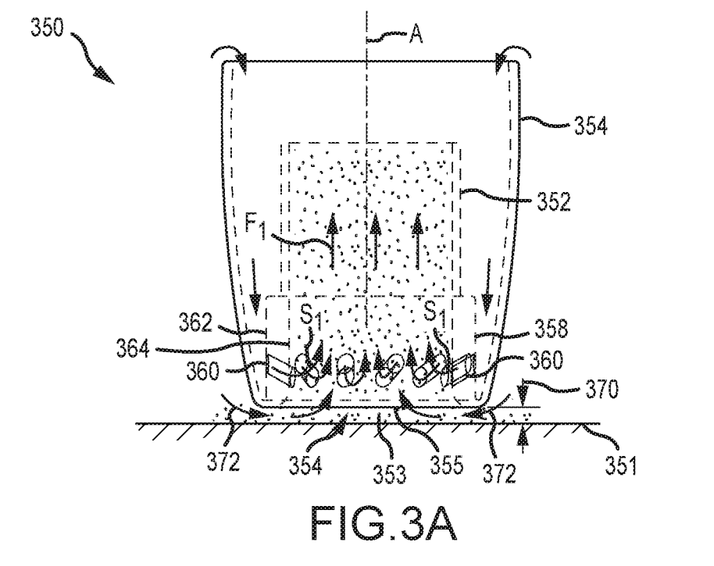
FIGS. 3A and 3B are side views of an end effector, in accordance with various embodiments.
Figure 3B:
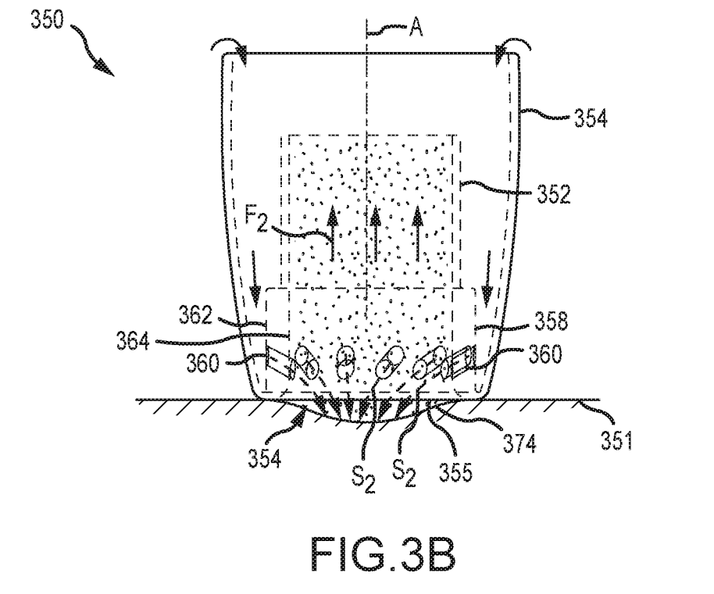

Referring now to FIGS. 3A and 3B, a vacuum end effector 350, such as, for example, the vacuum end effector 250 described above with reference to FIGS. 2A-2C, is illustrated. The vacuum end effector 350 is illustrated in a first position with respect to a material surface 351 (see FIG. 3A) and in a second position with respect to the material surface 351 (see FIG. 3B). Similar to the foregoing description, in various embodiments, the vacuum end effector 350 includes a central duct 352, a central duct inlet 354 and a shield 356, each of which may extend along or about a central axis A. In various embodiments, the central duct 352 includes a base member 358 that extends circumferentially about the central duct 352 and that includes a plurality of passages 360 extending from a radially outer surface 362 of the base member 358 to a radially inner surface 364 of the central duct 352. Typically, the plurality of passages 360 is disposed downstream of an inlet lip 355 that extends circumferentially about the central axis A and defines the central duct inlet 354.

Referring now to FIG. 3A, the vacuum end effector 350 is illustrated in the first position with respect to a material surface 351, such that the inlet lip 355 is disposed an axial distance 370 from the material surface 351. In such position (e.g., where the axial distance 370 is between approximately one to five millimeters (1-5 mm)), a main flow $F_1$ flows in a principally axial direction, with respect to the central axis A, by action of a vacuum applied to the central duct 352. The main flow $F_1$ is typically supplied by air (or other gas if within an inert gas environment) flowing from a substantially quiescent region outside the vacuum end effector 350, through an opening 353 defined by the axial distance 370, where the substantially quiescent air transitions into a substantially radial flow 372, and then into the central duct 352 where the main flow $F_1$ is established. In addition, a supplemental flow $S_1$ is set up to flow through each of the plurality of passages 360, typically by aspiration caused by the main flow $F_1$. In various embodiments, because the main flow $F_1$ is substantially unobstructed at the central duct inlet 354, the supplemental flow $S_1$ is rapidly entrained into the main flow $F_1$ and does not reach the material surface 351 in an appreciable manner. In the first position, powder (e.g., metal powder) at the material surface 351 is entrained, first by the radial flow 372 and subsequently by the main flow $F_1$, where it is carried through the central duct 352, into a suction hose and then to a storage tank, such as, for example, the suction hose 132 and the storage tank 134 described above with reference to FIG. 1.

Referring to FIG. 3B, the vacuum end effector 350 is illustrated in the second position with respect to the material surface 351. In the second position, the axial distance 370 becomes negligible (e.g., where the axial distance 370 is between zero and approximately one millimeter (0-1 mm)) such that the inlet lip 355 is disposed substantially in contact with the material surface 351 or even below the material surface 351 (e.g., where the axial distance 370 becomes negative). In such position, a surge condition occurs, where the main flow F that would otherwise exist (e.g., as in FIG. 3A) becomes obstructed. In the second position (or the surge condition), a vacuum remains applied to the central duct 352. However, because of the obstruction at the inlet lip 355, air from the quiescent region outside the vacuum end effector 350 is no longer entrained into the substantially radial flow 372 and then into the central duct 352. Rather, the vacuum now draws air through the plurality of passages 260. Because the full effect of the vacuum is now acting to draw air through the plurality of passages 260 only, a supplemental flow $S_2$ that is thereby set up is substantially stronger than the supplemental flow $S_1$ described above in the case of the first position (see FIG. 3A). Further, because the supplemental flow $S_2$ is not required to flow against a main flow $F_2$ having the same flow rate as the main flow $F_1$ described above, due to the obstruction at the inlet lip 355, the supplemental flow $S_2$ now reaches and is able to penetrate the material surface 351. Penetration of the material surface 351 facilitates the entrainment of powder from the material surface 351 and into the main flow $F_2$, where it is carried through the central duct 352, into a suction hose and then to a storage tank, such as, for example, the suction hose 132 and the storage tank 134 described above with reference to FIG. 1. In addition, as the supplemental flow $S_2$ continues to entrain powder from the material surface 351 into the main flow $F_2$, a size of a penetration region 374 will eventually reach a size of the central duct inlet 354, defined by the inlet lip 355, and thereby enable transition from the second position (or surged position) back to the first position.

Figure 4:
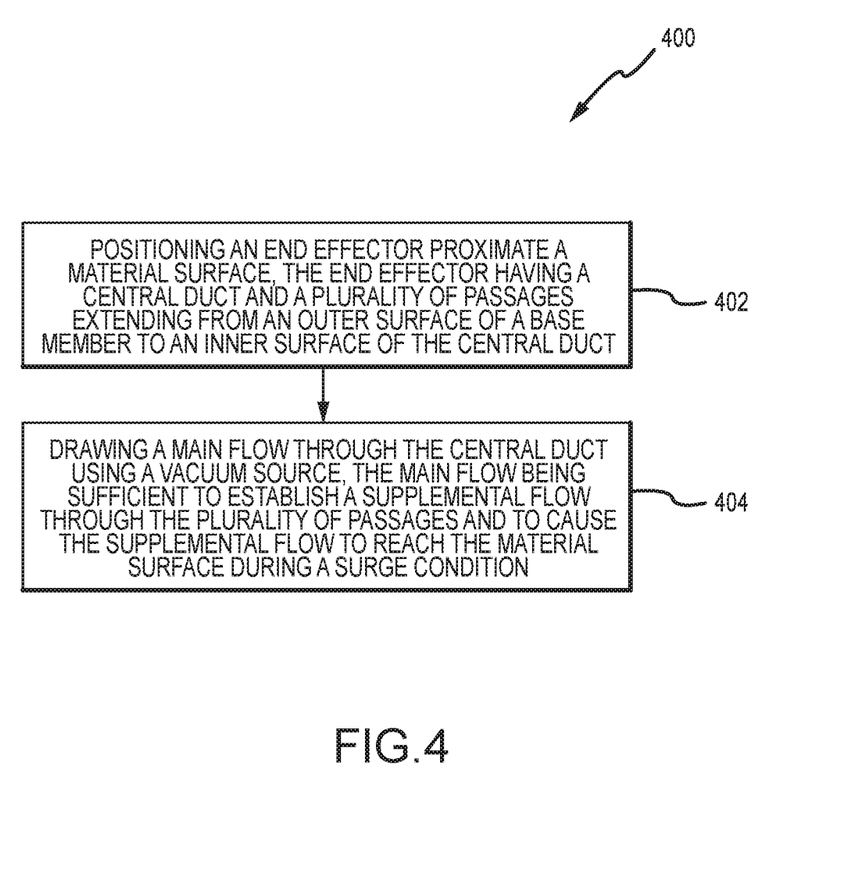
FIG. 4 describes method steps of removing powder from a material surface during a surge condition, in accordance with various embodiments.

Referring now to FIG. 4, a method 400 for removing a powder from a material surface during a surge condition is described. In a first step 402, the method includes positioning an end effector proximate the material surface, the end effector having a central duct having a first end configured for connection to a vacuum source and a second end defining a central duct inlet, a base member proximate the second end of the central duct, and a plurality of passages extending from an outer surface of the base member to an inner surface of the central duct. In a second step 404, the method includes drawing a main flow through the central duct using the vacuum source, the main flow being sufficient to establish a supplemental flow through the plurality of passages and to cause the supplemental flow to reach the material surface during the surge condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An end effector for a vacuum system, comprising: a central duct having a first end configured for connection to a vacuum source and a second end defining a central duct inlet, the central duct configured to provide a main flow passing through the central duct; a base member proximate the second end of the central duct; a plurality of passages extending from an outer surface of the base member to an inner surface of the central duct, the plurality of passages characterized by a passage axis having an axial vector component; and an exterior shield defining a fluid space between the central duct and the exterior shield, the exterior shield being in fluid communication with each of the plurality of passages, the exterior shield having an opening opposite the plurality of passages, the exterior shield configured to provide a supplemental flow passing through the opening, the fluid space, and the plurality of passages.

2. The end effector of claim 1, wherein the central duct inlet is defined by an inlet lip extending about a central axis that extends longitudinally along the central duct.

3. The end effector of claim 2, wherein the exterior shield extends along the central axis from the central duct inlet toward the second end.

4. The end effector of claim 3, wherein a first opening of each of the plurality of passages is in fluid communication with the fluid space between the central duct and the exterior shield.

5. The end effector of claim 4, wherein the central duct and the exterior shield are circular in cross section and the fluid space is defined by an annular space between the central duct and the exterior shield.

6. The end effector of claim 1, wherein the plurality of passages induces the supplemental flow by the main flow passing through the central duct.

7. The end effector of claim 6, wherein the axial vector component is defined by an axial angle between the passage axis and a central axis that extends longitudinally along the central duct.

8. The end effector of claim 7, wherein the axial angle is about forty-five degrees.

9. The end effector of claim 6, wherein the passage axis has a radial vector component defined by a radial angle between the passage axis and a radial axis extends perpendicular to a central axis that extends longitudinally along the central duct.

10. The end effector of claim 9, wherein the radial angle is about thirty degrees.

11. A powder removal system configured for removal of powder at a material surface, comprising: a vacuum system having a storage tank and a suction hose; a central duct having a first end configured for connection to the suction hose and a second end defining a central duct inlet, the central duct inlet configured for positioning proximate the powder at the material surface; a base member proximate the second end of the central duct; a plurality of passages extending from an outer surface of the base member to an inner surface of the central duct, the plurality of passages oriented to provide a supplemental flow toward the material surface during a surge condition; and an exterior shield extending along a central axis and adjacent to and about the central duct forming a fluid space between the central duct and the exterior shield, the fluid space being open near the second end, the exterior shield configured to provide the supplemental flow passing through the fluid space during the surge condition.

12. The powder removal system of claim 11, wherein the exterior shield extends from the central duct inlet toward the second end.

13. The powder removal system of claim 12, wherein a first opening of each of the plurality of passages is in fluid communication with the fluid space between the central duct and the exterior shield.

14. The powder removal system of claim 13, wherein the central duct inlet is defined by an inlet lip extending about the central axis and configured for positioning proximate the material surface.

15. The powder removal system of claim 11, wherein the plurality of passages is configured to induce the supplemental flow by a main flow passing through the central duct.

16. The powder removal system of claim 15, wherein at least a subset of the plurality of passages is characterized by a passage axis having an axial vector component defined by an axial angle between the passage axis and a central axis that extends longitudinally along the central duct.

17. The powder removal system of claim 16, wherein the passage axis has a radial vector component defined by a radial angle between the passage axis and a radial axis extending perpendicular to the central axis.

* * * * *